US011233454B2

(12) United States Patent
Wang

(10) Patent No.: US 11,233,454 B2
(45) Date of Patent: Jan. 25, 2022

(54) POWER STAGES AND CURRENT MONITOR OUTPUT SIGNAL (IMON) GENERATION CIRCUIT

(71) Applicant: ALPHA AND OMEGA SEMICONDUCTOR INTERNATIONAL LP, Toronto (CA)

(72) Inventor: Xiangcheng Wang, Austin, TX (US)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 0 days.

(21) Appl. No.: 16/860,158

(22) Filed: Apr. 28, 2020

(65) Prior Publication Data
US 2021/0336544 A1    Oct. 28, 2021

(51) Int. Cl.
*H02M 3/158*    (2006.01)
*H02M 1/08*    (2006.01)
*H02M 1/00*    (2006.01)

(52) U.S. Cl.
CPC ....... *H02M 3/1584* (2013.01); *H02M 1/0009* (2021.05); *H02M 1/08* (2013.01); *H02M 3/1586* (2021.05)

(58) Field of Classification Search
CPC .... H02M 3/156; H02M 3/158; H02M 3/1584; H02M 3/1586; H02M 3/1588; H02M 1/0009
See application file for complete search history.

(56) References Cited

U.S. PATENT DOCUMENTS

| 8,710,810 | B1 * | 4/2014 | McJimsey | G05F 1/462 323/272 |
| 9,240,722 | B2 * | 1/2016 | Luo | H02M 1/36 |
| 9,780,662 | B1 * | 10/2017 | Milanesi | H02M 3/156 |
| 10,594,313 | B2 * | 3/2020 | Zhang | H03K 17/166 |

(Continued)

OTHER PUBLICATIONS

Vishay, SIC645A, 60 A, VRPower® Smart Power Stage (SPS) Module, retrieved online on Mar. 5, 2020 from <https://www.digikey.com/en/product-highlight/v/vishay-siliconix/sic645a-60-a-vrpower-smart-power-stage-sps-module>, datasheet, 18 pages.

(Continued)

*Primary Examiner* — Alex Torres-Rivera
(74) *Attorney, Agent, or Firm* — Craige Thompson; Thompson Patent Law; Timothy D. Snowden

(57) ABSTRACT

Apparatus and associated methods relate to implementing an auto-inductance-detection architecture to reconstruct current monitor output (IMON) when a low-side switch in a power stage is on. In an illustrative example, an IMON generation circuit may include a variable resistor. A close loop control (e.g., OTA, switches, and variable resistor) may be configured to adjust a resistance value of the variable resistor automatically. The IMON generation circuit may also include a low pass filter coupled to a switching node of the power stage to receive a corresponding signal and provide a DC value. The difference between the corresponding signal and the DC value may be configured to enable or disable the close loop control. By providing the close loop control, the IMON generation circuit may advantageously perform auto-inductance detection (AID) and provide a more accurate IMON reconstruction method.

20 Claims, 7 Drawing Sheets

(56) References Cited

U.S. PATENT DOCUMENTS

| | | | | |
|---|---|---|---|---|
| 2014/0097818 A1* | 4/2014 | Wiktor | ................ | H02M 3/156 |
| | | | | 323/283 |
| 2014/0300330 A1* | 10/2014 | Sugiyama | ............ | H02M 3/156 |
| | | | | 323/271 |
| 2017/0346385 A1* | 11/2017 | Liang | .................... | H02M 1/084 |
| 2020/0127565 A1* | 4/2020 | Liang | .................... | H02M 3/156 |
| 2020/0153338 A1* | 5/2020 | Ribarich | ................ | H02M 1/08 |
| 2021/0006159 A1* | 1/2021 | Ke | ....................... | H02M 3/158 |

OTHER PUBLICATIONS

Alpha & Omega Semiconductor, 80 Amp, High-Performance Smart Power Stage (SPS), retrieved online on Feb. 26, 2020 from <http://www.aosmd.com/res/data_sheets/AOZ5473QE.pdf>, datasheet, 18 pages.

\* cited by examiner

POWER STAGES AND CURRENT MONITOR OUTPUT SIGNAL (IMON) GENERATION CIRCUIT

TECHNICAL FIELD

Various embodiments relate generally to power stages.

BACKGROUND

Electronic devices, which may also be referred to as loads, receive power from a variety of electrical power sources. For example, some power sources may couple to a load device at a wall outlet (e.g., from a mains source) or may couple more directly to various local and/or portable sources (e.g., batteries, renewable energy sources, generators). Some load devices, such as central processing units (CPUs) and graphics processors (GPUs) continue to develop higher input current requirements while demanding tight voltage regulation and/or high efficiency from the power source.

In some electronic devices, the source voltage supply (e.g., battery input, rectified mains supply, intermediate DC supply) may be converted to a load compatible voltage by various voltage conversion circuits. Switch-mode power supplies have gained popularity as voltage conversion circuits due to their high efficiency and therefore are often used to supply a variety of electronic loads.

Switch-mode power supplies convert voltages using switching devices that turn on with very low resistance and turn off with very high resistance. Switch-mode power supplies may charge an output inductor during a period of time and may release part or all of the inductor energy during a subsequent period of time. The output energy may be delivered to a bank of output capacitors, which provide the filtering to produce a DC output voltage. In buck-derived switch-mode power supplies, the output voltage, in a steady state, may be approximately the input voltage times a duty cycle, where the duty cycle is the duration of the on-time of a pass switch divided by the total on-time and off-time of the pass switch for one switching cycle.

SUMMARY

Apparatus and associated methods relate to implementing an auto-inductance-detection architecture to reconstruct current monitor output (IMON) when a low-side switch in a power stage is on. In an illustrative example, an IMON generation circuit may include a variable resistor. A close loop control (e.g., OTA, switches, and variable resistor) may be configured to adjust a resistance value of the variable resistor or other equivalent current source automatically. The IMON generation circuit may also include a low pass filter coupled to a switching node of the power stage to receive a corresponding signal and provide a DC value. The difference between the corresponding signal and the DC value may be configured to regulate the current source for IMON emulation signal. By providing the close loop control, the IMON generation circuit may advantageously perform auto-inductance detection (AID) and provide a more accurate IMON reconstruction method.

Various embodiments may achieve one or more advantages. For example, in some embodiments, as the architecture of the IMON generation circuit is simplified, the trimming process applied to the IMON generation circuit may also be advantageously simplified. In some embodiments, the IMON generation circuit may provide both temperature and PVCC (e.g., power rail for high-side and low-side MOSFET drivers) compensation to further improve the accuracy of the current sensing and reconstruction of IMON. In some embodiments, the IMON generation circuit may use the auto-inductance detection (AID) such that no extra external pin is needed to manually set the inductance value. As inductance may change with, for example, operating current, and/or operating temperature, by applying AID to consider the inductance variants in operation, some embodiments may also greatly improve the IMON accuracy. Accordingly, the method of reconstructing IMON may be advantageously simplified.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a power converter having exemplary smart power stages (SPSs) is briefly introduced with reference to FIGS. 1A-1B. Second, with reference to FIGS. 2-4B, the discussion turns to exemplary embodiments that illustrate the architectures and operations of the smart power stage and IMON generation circuit. Finally, with reference to FIG. 5, further explanatory discussion is presented to explain the method to implement the IMON generation circuit.

DC-to-DC voltage conversion is often performed by Switching Voltage regulators, or step-down regulators, also referred to as voltage converters or point-of-load (POL) regulators/converters, converting a higher Voltage (e.g., 12V) to a lower value as required by one or more load devices. More generally, voltage regulators and current regulators are commonly referred to as power converters, and as used herein, the term power converter is meant to encompass all such devices.

Figure 1A:
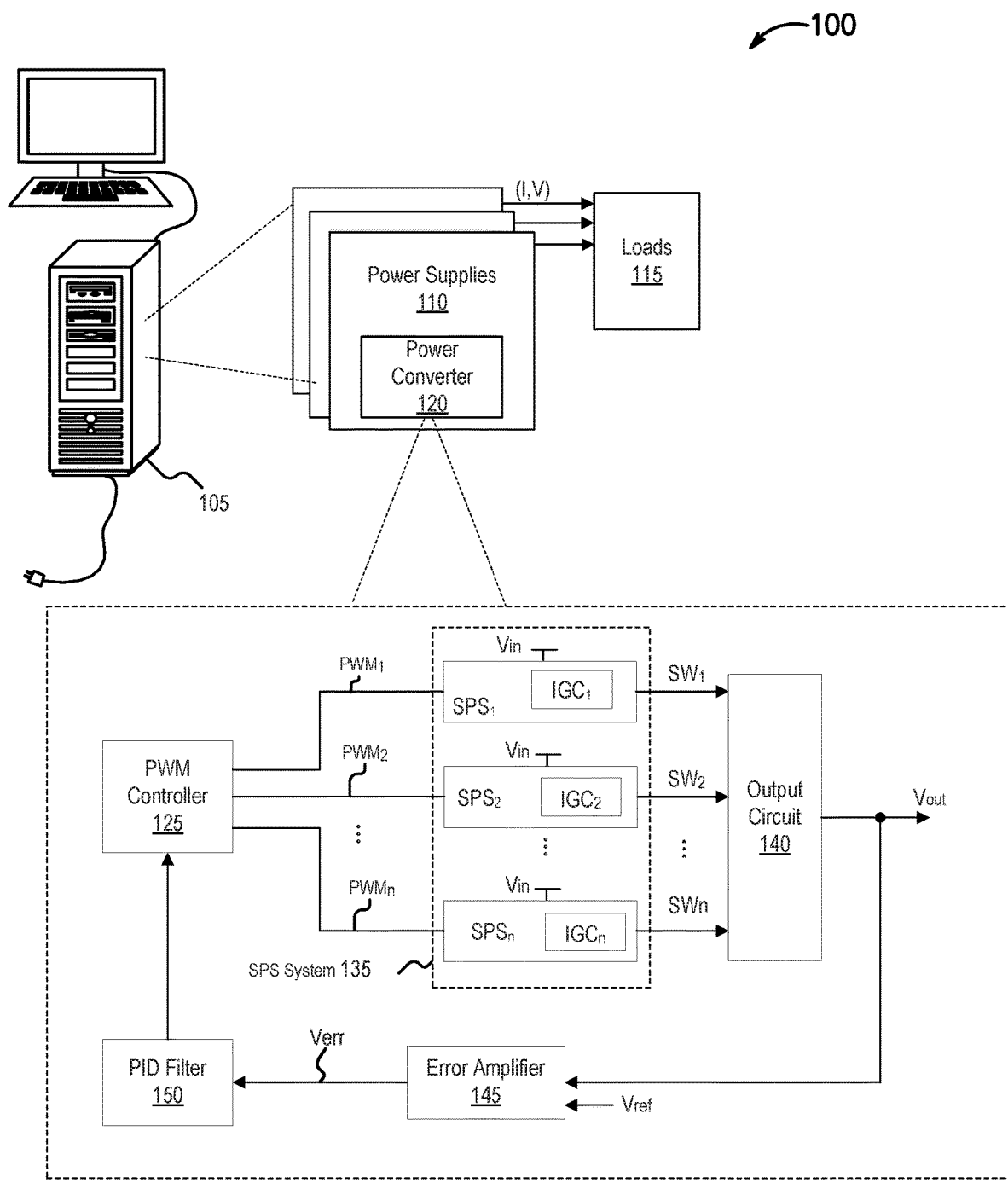
FIG. 1A depicts a power converter implemented with an exemplary smart power stage (SPS) system.

FIG. 1A depicts a power converter implemented with an exemplary smart power stage (SPS) system. In this depicted example, an exemplary system 100 includes a powered load system 105. The powered load system 105 includes one or more interleaved power supplies 110 implemented in the computer 105 supplying one or more loads 115. In some examples, the loads 115 may be specified to operate at an input voltage with limited voltage perturbations. The power supplies 110 include a power converter 120. The power converter 120 regulates currents or voltages supplied to the loads 115. The power converter 120 is configured to dynamically modulate the frequency of a switch signal to achieve a fast transient response. More specifically, the power converter 120 includes a pulse width modulator (PWM) controller 125 controlling the input to associated power switches, which may support, for example, reducing output capacitance.

In an illustrative example, the PWM controller 125 generates one or more pulse width modulation (PWM) signals (e.g., $PWM_1$, $PWM_2$, ..., $PWM_n$) with commanded duty cycle at the frequency of $f_{sw}$. The power converter 120 also includes a smart power stage (SPS) system 135. The SPS system 135 includes N smart power stages. Each power stage (e.g., $SPS_1$, $SPS_2$, ..., $SPS_n$) of the N power stages 135 receives one of the generated PWM signals (e.g., $PWM_1$, $PWM_2$, ..., $PWM_n$), each of the PWM signals may have an interleaved phase (e.g., delay) corresponding to its respective SPS. Each power stage may deliver a corresponding output signal ($SW_1$, $SW_2$, ..., $SW_N$) in order to create a substantially balanced share of the power to the load by supplying a controlled stage output current ($I_{L1}$, $I_{L2}$, $I_{L3}$, $I_{L4}$) via an output circuit 140. In various embodiments, the output circuit 140 may include one or more inductive elements (e.g., via an inductor couple in series between the output of the SPS and the common load node), which may include coupled or uncoupled windings, for example, between stages. The connections between the SPS system 135 and the PWM controller 125 are described in further detail with reference to FIG. 1B. Each SPS in the SPS system 135 includes a current monitor output signal (IMON) generation circuit (IGC). The IGC may be configured to generate the current monitor output signal IMON referenced to a reference voltage. An exemplary architecture of the IGC is discussed in further detail with reference to FIG. 3.

In some embodiments, each power stage (e.g., $SPS_1$, $SPS_2$, ..., $SPS_n$) of the SPS system 135 may include one or more switching devices, which in some implementations may be referred to as power transistors. The power converter 120 may switch a pair of power transistors to produce a rectangular-wave at the transistors' common node/switching node SW. The produced rectangular-wave may be smoothed out using the output circuit 140 to produce a desired unipolar (e.g., DC) output voltage $V_{out}$. In some examples, an SPS may refer to a power stage having integrated high accuracy current and temperature monitors that can be fed back to the PWM controller 125 and/or phase doubler to complete a multiphase DC-DC system.

In some embodiments, the PWM controller 125 may have N PWM pins to output the N PWM signals. To complete a DC-DC system, the PWM controller 125 may also receive a composite of stage current monitor output signals (e.g., $IMON_1$, $IMON_2$, $IMON_3$, $IMON_4$) to adjust a duty cycle of the PWM signals that the PWM controller 125 supplies to each stage. The PWM controller may, in response to the current monitor output signals, adjust the duty cycle of the stage power output signals $PWM_i'$ in order, for example, to adjust a voltage level for $V_{out}$. In addition, each of the SPS circuits may, in response to the current monitor output signals, operate to adjust the duty cycle for that corresponding SPS in order to substantially regulate the current supplied from that phase according to the composite of the stage current monitor signals. An exemplary architecture of an SPS is described in further detail with reference to FIG. 2.

The power converter 120 also includes an error amplifier 145. The error amplifier 145 receives the output voltage signal $V_{out}$ and a reference voltage signal $V_{ref}$ to generate an error signal $V_{err}$. In the depicted example, the error signal may be received by a proportional-integral-derivative (PID)) filter 150. The PID filter 150, the PWM controller 125, and the SPS system 135 may be configured as a feedback loop operable to control the duty cycle so as to regulate the output voltage $V_{out}$.

Figure 1B:
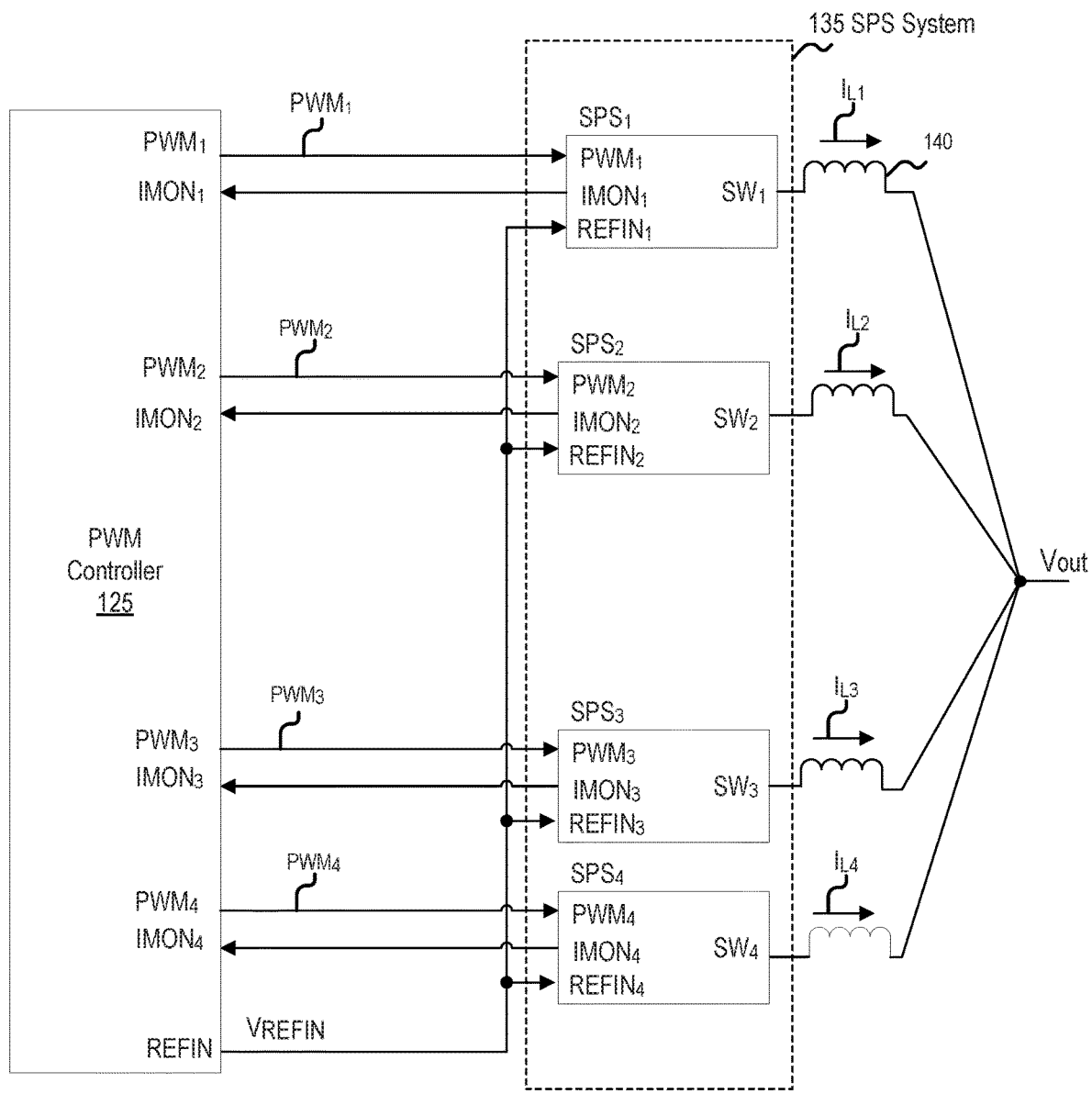
FIG. 1B depicts connections between the exemplary SPS system and a PWM controller in the power converter.

FIG. 1B depicts connections between the exemplary SPS system and a PWM controller in the power converter. In this depicted example, a PWM controller (e.g., the PWM controller 125) generates four PWM signals (e.g., $PWM_1$, $PWM_2$, $PWM_3$, and $PWM_4$). Each smart power stage (e.g., $SPS_1$, $SPS_2$, $SPS_3$, or, $SPS_4$) in the SPS system 135 receives a corresponding PWM signal (e.g., $PWM_1$, $PWM_2$, $PWM_3$, $PWM_4$) and generates a corresponding current monitor output signal (e.g., $IMON_1$, $IMON_2$, $IMON_3$, $IMON_4$) referenced to a corresponding reference voltage $V_{REFIN}$. The reference voltage VREFIN may be a direct voltage supplied by an external source. In this depicted example, the reference voltage VREFIN is supplied by the PWM controller 125.

In this depicted example, each current monitor output signal (e.g., $IMON_1$, $IMON_2$, $IMON_3$, $IMON_4$) generated by each smart power stage (SPS) may be then received by the PWM controller 125. The corresponding signal IMON may be generated by the corresponding IGC implemented in the corresponding SPS. An exemplary architecture of an SPS is described in further detail with reference to FIG. 2. An exemplary architecture of an IGC is described in further detail with reference to FIG. 3.

Figure 2:
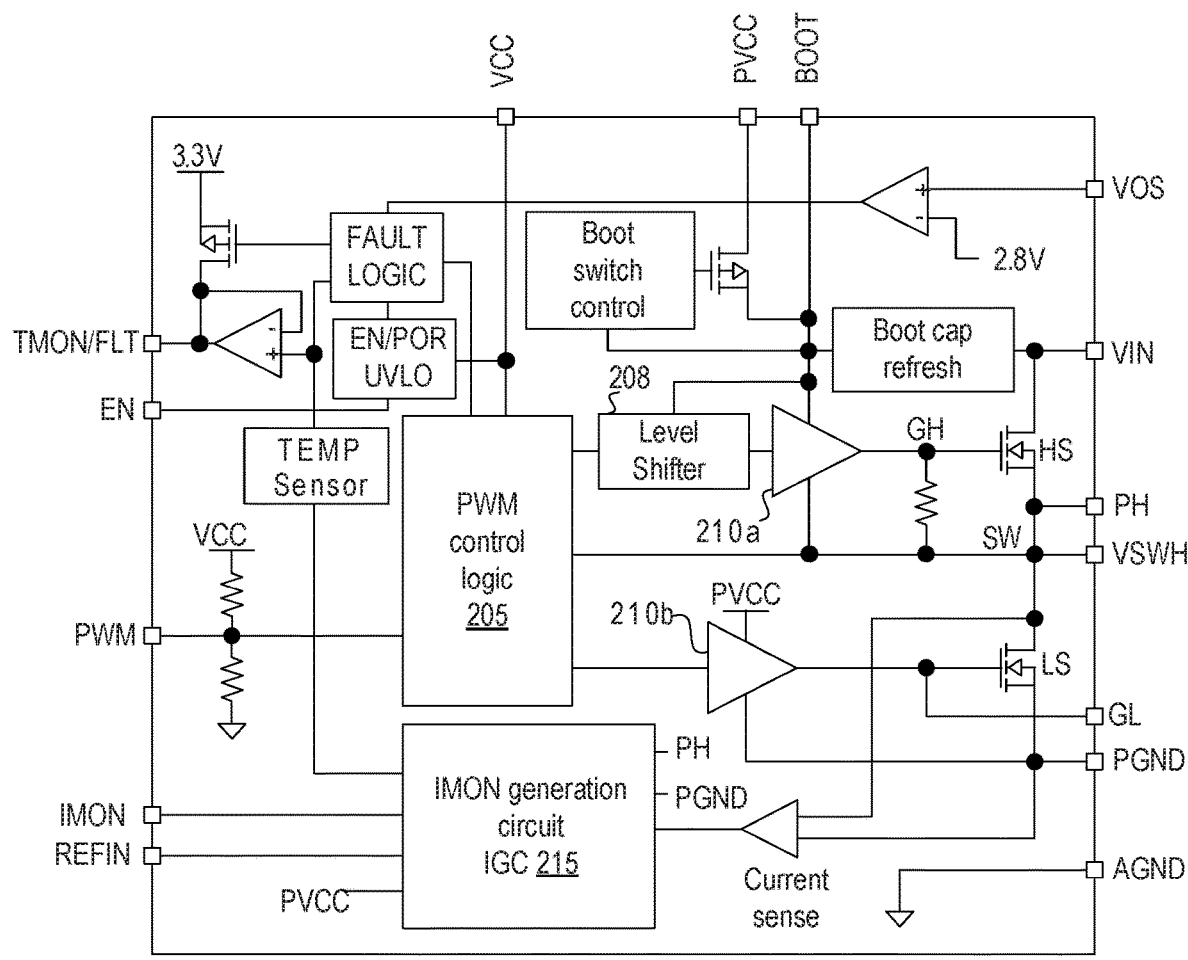
FIG. 2 depicts an architecture of an exemplary SPS in the SPS system.

FIG. 2 depicts an architecture of an exemplary SPS in the SPS system. In this depicted example, an SPS 200 (e.g., $SPS_1$, $SPS_2$, ..., $SPS_n$) includes a PWM control logic 205 configured to receive a corresponding PWM signal PWM (e.g., $PWM_1$, $PWM_2$, ..., $PWM_n$) from the PWM controller 125. A level shifter 208 is coupled to an output of the PWM control logic 205. The SPS 200 also includes a first driver 210a coupled to the level shifter 208 and configured to drive a high-side MOSFET (HS). The SPS 200 also includes a second driver 210b coupled to the other output of the PWM control logic 205 and configured to drive a low-side MOSFET (LS). An intermediate node SW is formed between the HS and LS. Supplies VCC and PVCC provide power supplies for the PWM control logic 205 and the second driver 210b, respectively. As shown, the SPS 200 includes a voltage input $V_{IN}$ to receive input power. An IMON generation circuit IGC 215 is coupled to the intermediate node SW and generate a corresponding IMON signal referenced to VREFIN.

In some embodiments, the SPS may be a high efficiency synchronous buck smart power stage module consisting of two asymmetrical MOSFETs and an integrated driver. The MOSFETs may be individually optimized for operation in the synchronous buck configuration. The high-side MOSFET may be optimized to achieve low capacitance and gate charge for fast switching with low duty cycle operation. The low-side MOSFET may have an ultra-low ON resistance to minimize conduction loss.

In this depicted example, highly accurate current (IMON) and temperature (TMON) monitors are integrated in the SPS 200. The PWM controller 125, when used with the SPS 200, may digitize IMON and TMON to provide fault protection and telemetry via the digital communication bus. A dual functionality TMON/FLT pin reports temperature information during normal operating conditions and also reports over-current (OC), over-temperature (OT), HS-FET short, LS-FET short faults. When a fault is detected, the TMON/

FLT pin may be pulled high. The SPS protection may also include thermal shutdown. A bootstrap switch, with auto boot refresh feature, is integrated into the driving circuit (e.g., the first driver 210a and the second driver 210b). The low-side MOSFET can be driven into diode emulation mode to provide asynchronous operation when required. The pin-out may be optimized for low inductance routing of the converter, keeping the parasitic effects to a minimum.

In some embodiments, the high and low-side power MOSFETs may be combined in one package with the pin outs optimized for power routing with minimum parasitic inductance. The MOSFETs may be individually tailored for efficient operation as either high-side or low-side switches in a low duty cycle synchronous buck converter. In addition, a high current driver may be also included in the package which minimizes the gate drive loop resulting to extremely fast switching. In some embodiments, the boost supply for driving the high-side MOSFET may be generated by connecting a small capacitor between BOOT pin and the switching node PHASE. The capacitor may be connected as close as possible to the device. A boost diode may also be integrated into the package.

During initial start-up, the VCC voltage rise is monitored. Once the rising VCC voltage exceeds, for example, 4.15V, a normal operation of the driver is enabled. The PWM signals are passed through to the gate driving circuit, the TMON output is valid and the IMON output starts at zero and becomes valid on the first low-side gate signal. If VCC drops below the falling threshold of, for example, 3.85V, operation of the driving circuit may be disabled. VCC is monitored for under-voltage lockout (UVLO) conditions and both outputs may be actively held low unless adequate gate supply is available. Since the PWM control signals are provided from an external controller (e.g., the PWM controller 125) or a digital, the SPS 200 may be powered up before the PWM input is applied.

The SPS 200 may precisely sense the current delivered through the low-side MOSFET. The signal is reported through the IMON pin scaled with a, for example, 5 mV/A gain and is referenced to an externally supplied voltage (e.g., VREFIN applied to pin REFIN). The current information delivered to the controller may be internally compensated for the temperature drifts thus removing the necessity for temperature compensation into the controller itself. The current is sensed during low-side conduction time and estimated during high-side conduction time to reconstruct entire inductor current waveform. A resistor connected to LSET pin may program the inductor value used in the application to construct the current waveform during high-side MOSFET conduction.

Figure 3:
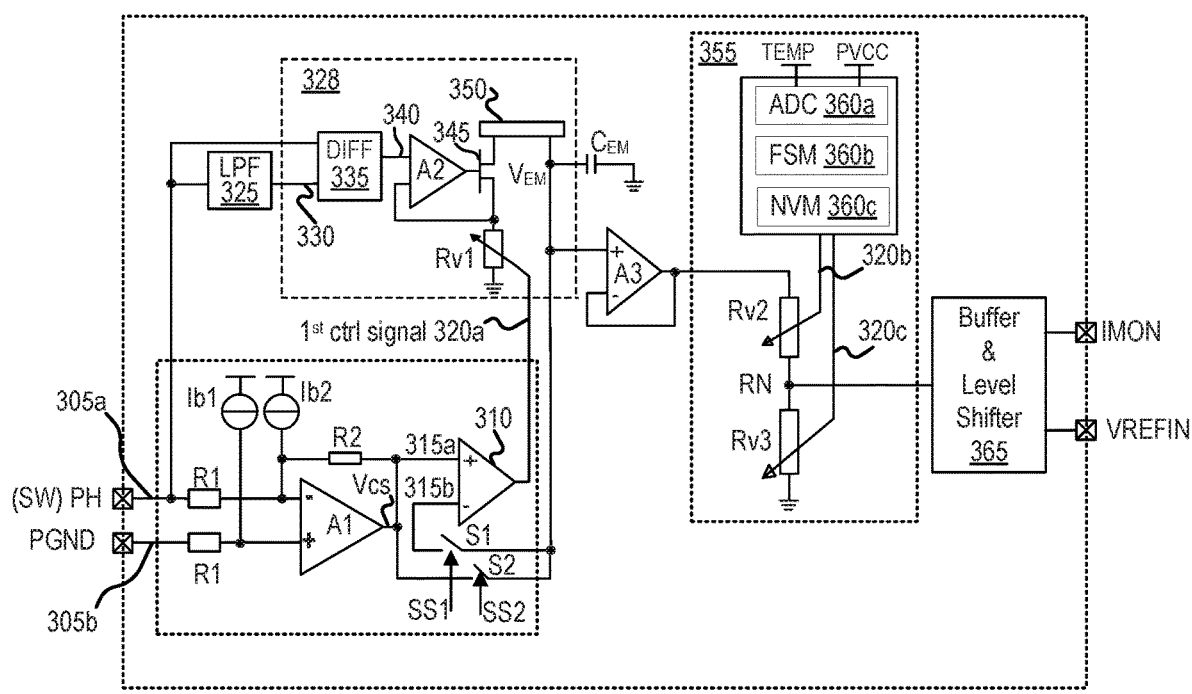
FIG. 3 depicts an architecture of an exemplary current monitor output signal (IMON) generation circuit implemented in the SPS.

FIG. 3 depicts an architecture of an exemplary current monitor output signal (IMON) generation circuit (IGC) implemented in the SPS 200. In this depicted example, an exemplary IGC 215 includes a first input terminal electrically connected to the switching node SW (e.g., through the pin PH). The IGC 215 also includes a second input terminal electrically connected to a second input node (e.g., through the pin PGND) and a third input terminal electrically connected to a third input node (e.g., through the pin VREFIN). The IGC 215 also includes a fourth input terminal electrically connected to receive the power supply PVCC. The IGC 215 also includes an output terminal electrically connected to an output node (e.g., through the pin IMON). The IGC 215 is configured to obtain a voltage VIMON (IMON-VREFIN) by sensing inductor current $I_L$ directly or indirectly, then obtain a constant gain $R_{IMON}$ (such as 5 mV/A) along with $I_L$.

More specifically, the IGC 215 includes a first operational amplifier A1 coupled to the switching node SW through the pin PH to receive a first signal 305a (e.g., Vin when the high-side MOSFET HS is on, Vd when both high-side and low-side MOSFETs are off, $-I_L XR_{DSON}$ when the low-side MOSFET LS is on, Vd is the body diode voltage across the low-side MOSFET LS) and the pin PGND to receive a second signal 305b (e.g., power ground GND). The first signal 305a can be used for output voltage estimation by a low pass filter (LPF) and can also be saved for output voltage $V_{out}$ sensing.

The first operational amplifier A1 is configured to inverse-amplify the PH signal (e.g., $-I_L XR_{DSON}$) when the low-side MOSFET LS is on (e.g., when gate line GL (shown in FIG. 2) applied to the gate of the low-side MOSFET LS is high) by a fixed gain (e.g., R2/R1) to get a voltage signal $V_{CS}$ that is proportional to inductor current $I_L$. In this depicted example, the first operational amplifier A1 includes an inverting operational amplifier with a fixed gain $R_2/R_1$.

The IGC 215 also includes a first current source Ib1 and a second current source Ib2 coupled to the two inputs of the first operational amplifier A1, respectively. These two current sources Ib1 and Ib2 may be used to provide a bias voltage (e.g., Ib1/Ib2×R1) to improve the amplifier linearity at low input voltage application, for example.

The IGC 215 also includes an amplifier 310 having an input 315a electrically connected to an output of the first operational amplifier A1 and an input 315b. The amplifier 310 is configured to generate a first control signal 320a. In this depicted example, the amplifier 310 includes an operational transconductance amplifier (OTA).

The IGC 215 also includes a voltage generation circuit, such as a low-pass filter (LPF) 325 shown, or alternatively a direct output voltage sensing circuit (not shown), electrically connected to the switching node SW (through the pin PH) to receive the first signal 305a and generate a filtered signal 330 (e.g., the DC value $V_{out}$ of the first signal 305a). For example, when the high-side MOSFET HS is on, the first signal 305a may be substantially equal to Vin, and the filtered signal 330 may be substantially equal to $V_{out}$. When the low-side MOSFET LS is on, the first signal 305a may be substantially equal to 0. When both the HS and LS are off, the first signal 305a may be substantially equal to -Vd, where Vd is the body diode voltage across the LS. In this depicted example, the LPF 325 is configured to get the output voltage $V_{out}$ information. In some embodiments, a directly output voltage sensing mechanism may also be used to obtain the output voltage $V_{out}$ information.

A current generation circuit 328 is coupled to the output of the low-pass filter 325 to receive the filtered signal 330 and the SW node to receive the first signal 305a to generate a controlled current source to charge and discharge a capacitor $C_{EM}$. The circuit 328 includes a subtractor 335 electrically connected to the switching node SW to receive the first signal 305a and the filtered signal 330 to generate a differential signal 340. As shown in FIG. 2, the circuit 328 may optionally further include an operational amplifier (OPAMP) A2. The differential signal 340 is then received by the operational amplifier OPAMP A2. The OPAMP A2 may be configured to generate a current source to charge capacitor $C_{EM}$ for IMON signal emulation.

The current generation circuit 328 also includes a transistor 345 having a gate terminal, a source terminal and a drain terminal. In this depicted example, the transistor 345 includes an N-type metal-oxide-semiconductor field effect transistor (NMOSFET). The gate terminal of the NMOSFET 345 is electrically connected to an output of the OPAMP A2 to receive the differential signal 340. The source terminal of the NMOSFET 345 is electrically connected to a first variable resistor Rv1. The other terminal of the first variable resistor Rv1 is coupled to a reference voltage node (e.g., power ground GND). The first variable resistor Rv1 is configured to adjust its resistance value in response to the first control signal 320a generated by the OTA 310. Thus, an average inductance may be obtained automatically.

The current generation circuit 328 also includes a current mirror source 350 having a first terminal electrically coupled to the drain terminal, and a second terminal electrically coupled to one plate of a capacitor $C_{EM}$. The other plate of the capacitor $C_{EM}$ is coupled to a reference voltage node (e.g., power ground GND).

The input 315a of the OTA 310 is further electrically connected to the second terminal of the current mirror source 350 through a switch S2. An operational amplifier A3 is also electrically connected to the second terminal of the current mirror source 350. The input 315b of the OTA 310 is further electrically connected to the second terminal of the current mirror source 350 through a switch S1. The switch S1 and S2 are controlled by a corresponding switch signal SS1 and SS2, respectively. The timing diagrams of switch signals SS1 and SS2 are shown with reference to FIG. 4A. The differential signal 340 (e.g., the differential voltage between signal 305a and output voltage), the OPAMP A2, transistor 345, and the first variable resistor RV1 are used to generate a controlled current source to charge and discharge capacitor $C_{EM}$. The reconstructed signal $V_{EM}$ across $C_{EM}$ may track the real voltage signal $V_{CS}$ signal in close loop control (e.g., OTA 310, switch S1, switch S2, and variable resistor Rv1) only when the low-side MOSFET LS is on by enabling S1, then it achieves auto-inductance detection (AID). The reconstructed signal $V_{EM}$ may be updated periodically to the voltage signal $V_{CS}$ to set VEM initial DC value by enabling S2.

The IGC 215 also includes a temperature and PVCC compensation circuit 355 configured to compensate for the low-side MOSFET LS resistance (e.g., $R_{DSON}$) dependence on a temperature change and a gate voltage PVCC change. More specifically, the compensation circuit 355 includes an analog-to-digital converter (ADC) 360a configured to receive a temperature value TEMP and a gate voltage PVCC and sample those values to generate a conversion signal.

The compensation circuit 355 may also include a state machine 360b coupled to the ADC 360a to receive the conversion signal and generate a second control signal 320b and a third control signal 320c in response to a lookup table stored in a data store 360c (e.g., non-volatile memory NVM). The switch signals SS1 and SS2 may also be generated by the state machine 360b. In some embodiments, the state machine 360b may include a finite state machine coupled to a non-volatile memory NVM.

The compensation circuit 355 also includes a second variable resistor Rv2 and a third variable resistor Rv3 connected in series through a node RN. By adjusting the values of the second variable resistor Rv2 and/or the third variable resistor Rv3, a constant (e.g., 5 mV/A) scale may be achieved for IMON signal that is independent on temperature, gate voltage and the gain of the first OPAMP A1. The variable resistor series is coupled between the operational amplifier A3 and a reference voltage node (e.g., power ground GND). Each of the second variable resistor Rv2 and the third variable resistor Rv3 is configured to adjust its resistance value in response to the second control signal 320b and the third control signal 320c, respectively.

By adjusting the second variable resistor Rv2 and/or the third variable resistor Rv3, the compensation circuit 355 may compensate the MOSFETS' $R_{DSON}$ dependency on its operating temperature, gate voltage (PVCC), and obtain a constant value (e.g., 5 mV/A) along with OPAMP A1 gain (R2/R1) such that a voltage between pin IMON and pin VREFIN can be represented linearly to accurate inductor current as $I_L \times 5$ mV/A.

The compensation circuit 355 also includes a buffer and level shifting circuit 365 electrically coupled to the node RN. The buffer and level shifting circuit 365 also receives the reference voltage VREFIN from the PWM controller 125 and generate the corresponding current monitor output signal IMON. The operation of the SPS 200 and the IGC 215 are described in detail with reference to FIG. 4A. By providing the close loop control, the IMON generation circuit may advantageously perform auto-inductance detection (AID) and provide a more accurate IMON reconstruction method. In addition, as the architecture of the IMON generation circuit is simplified, the trimming process applied to the IMON generation circuit may also be advantageously simplified.

Figure 4A:
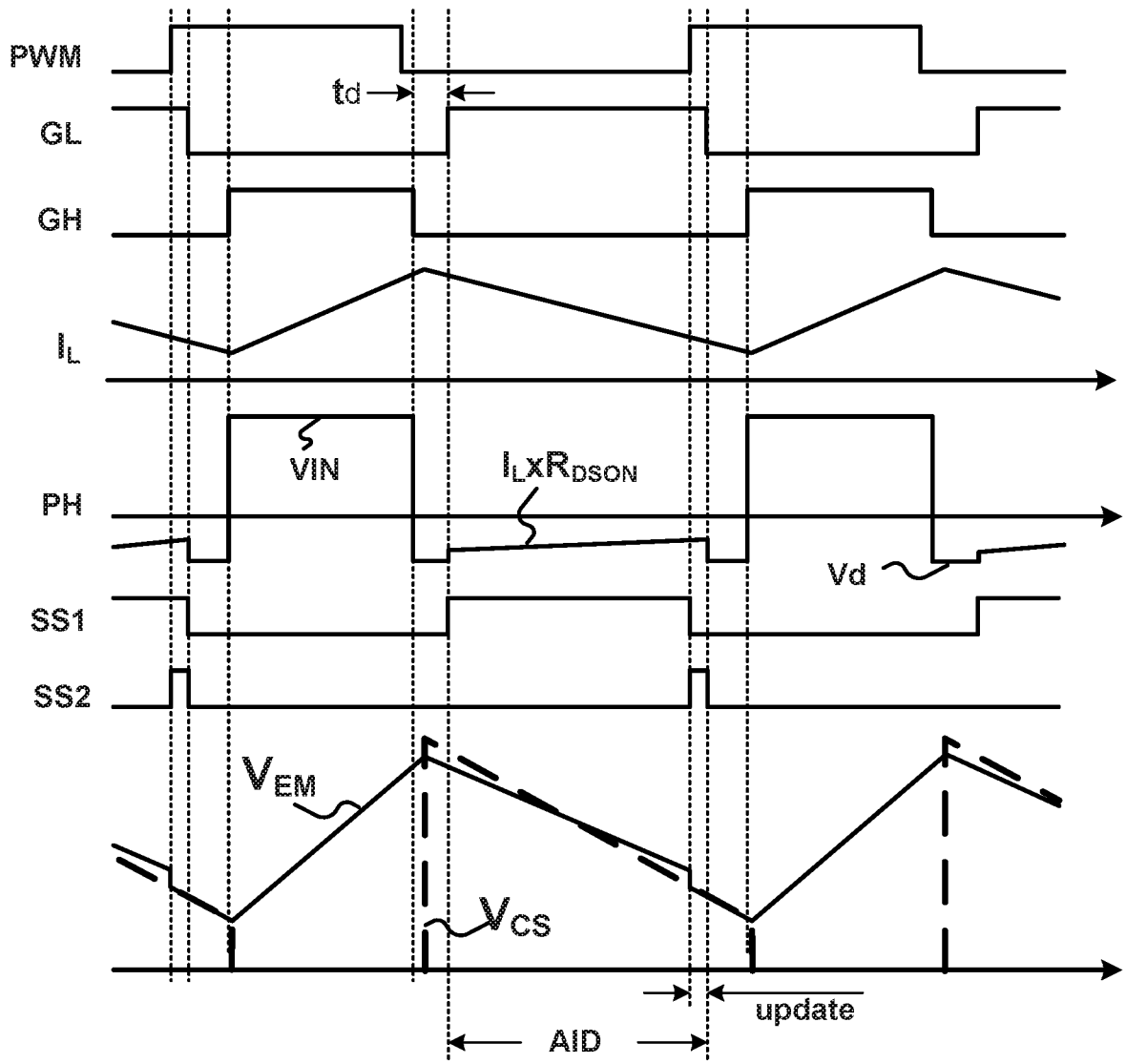
FIG. 4A depicts timing diagrams of exemplary signals in the IMON generation circuit and SPS.

FIG. 4A depicts timing diagrams of exemplary signals in the IMON signal generation circuit and SPS. When the low-side MOSFET LS in the SPS 200 is on, the voltage difference between a voltage at the switching node SW and the ground potential is used. A low-side MOSFET LS resistance $R_{DSON}$ may be implemented to perform current sensing. This voltage information across the low-side MOSFET LS resistance $R_{DSON}$ may be then used to reconstruct the falling edge of the IMON. For example, the SPS 200 may precisely sense the current delivered through the low-side MOSFET. The signal is reported through the IMON pin scaled with a, for example, 5 mV/A gain and is referenced to an externally supplied voltage (e.g., VREFIN applied to pin REFIN). The current is sensed during low-side conduction time and estimated during high-side conduction time to reconstruct entire inductor current waveform.

In this depicted example, PWM is input signal, GH is the signal applied to the high-side FET gate, GL is the signal applied to the low-side FET gate. $t_d$ is the dead time between GH and GL to prevent shoot-through. $I_L$ is inductor current. PH is switching node voltage (e.g., Vin, Vd, $-I_L \times R_{DSON}$ at different modes). SS1 is the switch signal applied to the switch S1 to control AID periods. SS2 is the switch signal applied to the switch S2 to update $V_{EM}$ initial value to $V_{CS}$. $V_{EM}$ is a voltage that emulates VIMON signal before compensation block. $V_{CS}$ is amplified voltage (e.g., R2/R1×$I_L$× $R_{DSON}$) when low-side FET is on.

When the PWM signal received by the SPS 200 is high, the high-side switch HS will be on, and the low-side switch LS will be off. The signal 305a (e.g., Vin) received at the pin PH, the signal 305b (e.g., power ground) received at the pin PGND that are used to reconstruct the rising edge current on the high-side switch HS. At the same time, the switch S1 is turned on (by the switch signal SS1) to enable the close loop control (e.g., OTA 310, switch S1, switch S2, and variable resistor Rv1) and adjust the resistance value of the variable resistor Rv1 and obtain the average inductance value to reconstruct the rising edge of the inductor current waveform. As shown in FIG. 4A, the switch S2 is turned on (by the switch signal SS2) at the falling edge of the PWM signal to set an initial inductance value. In some embodiments, the switch signals SS1 and SS2 may be generated by a logic circuit. For example, a logic AND circuit may directly apply both the signal at pin PWM and the signal GL to generate the switch signal SS2. The logic circuit may also receive the signal GL switch signal SS1 and the PWM signal to generate the switch signal SS1.

When the PWM signal received by the SPS 200 is low, the high-side switch HS will be off, and the low-side switch LS will be on with deadtime (td) control. The SPS 200 is then configured to perform current sensing directly. Thus, the close loop control in the IGC 215 is used to track $V_{EM}$ to real amplified current sense signal $V_{CS}$ and IGC 215 mimics both the rising edge and falling edge of the sensed inductor current, and this mimicked current may be buffered, compensated and level shifted for IMON signal output between pin IMON and pin VREFIN.

Figure 4B:
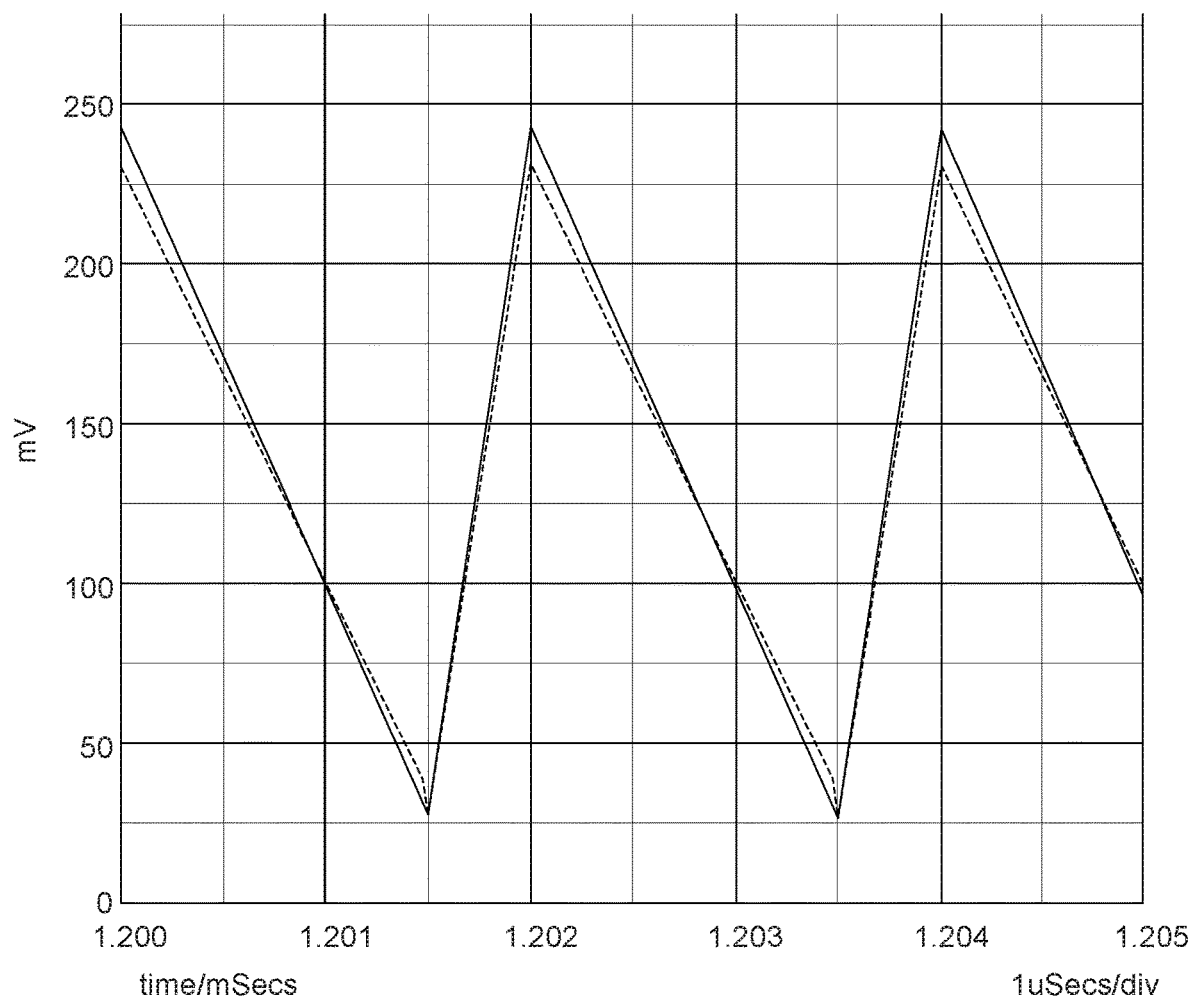
FIG. 4B depicts simulation results of an ideal IMON and reconstructed IMON provided by the exemplary IMON signal generation circuit.

FIG. 4B depicts simulation results of an ideal IMON signal and reconstructed IMON signal provided by the exemplary IMON signal generation circuit. Solid line means the reconstructed IMON signal generated by the IGC circuit 215, and the dashed line represents the real amplified $R_{DSON}$ current sense signal $V_{CS}$ when low side FET is on.

Figure 5:
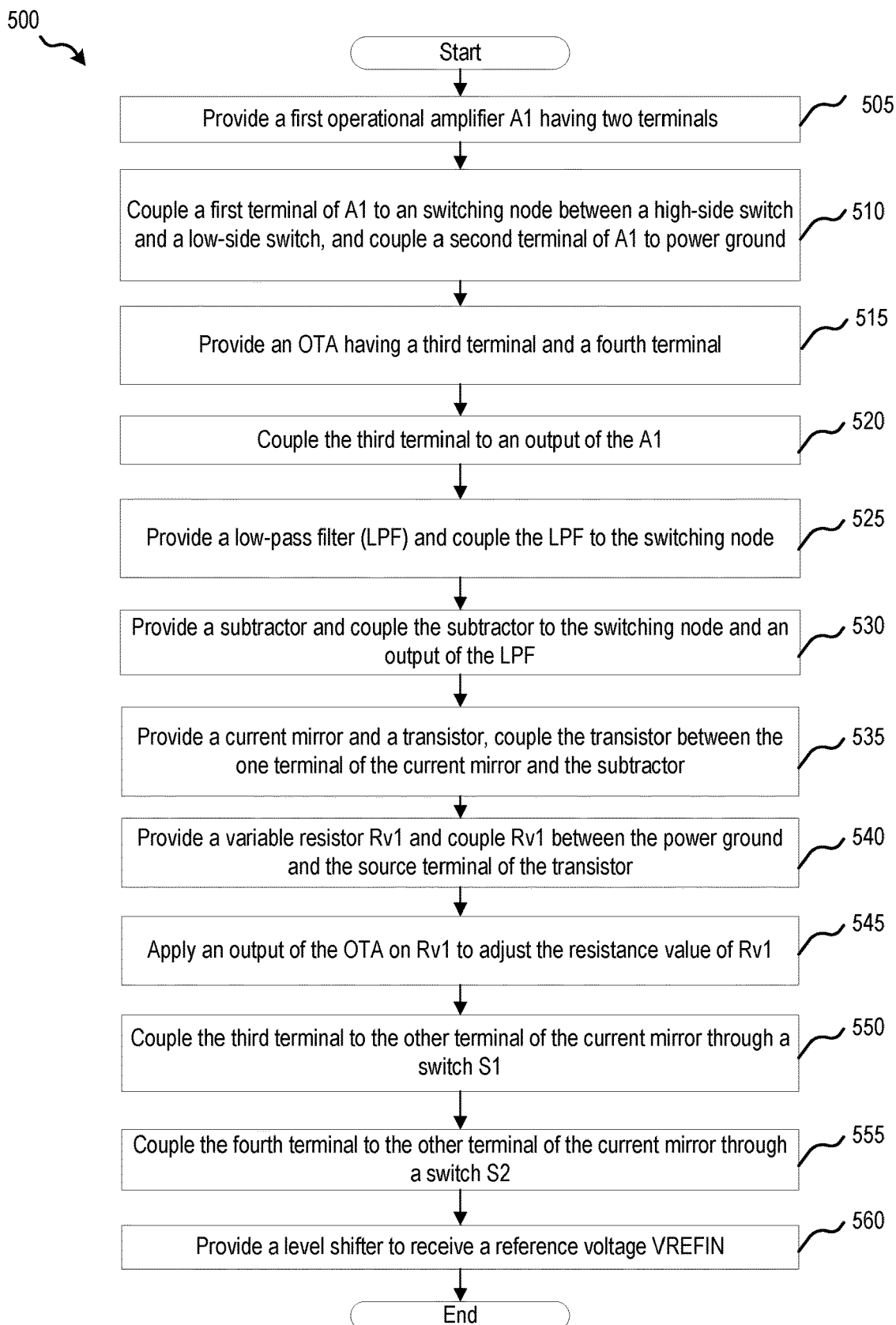
FIG. 5 depicts a flow chart of an exemplary method to implement the IMON generation circuit.

FIG. 5 depicts a flow chart of an exemplary method to implement the IMON generation circuit. A method 500 includes, at 505 and 510, providing a first operational amplifier (e.g., the first operation amplifier A1) and electrically coupling a first input of the first operation amplifier A1 to an switching node SW (e.g., through the pin PH) between a high-side switch HS and a low-side switch LS, and coupling a second input of the first operation amplifier A1 to, for example, power ground PGND.

The method 500 also includes, at 515 and 520, providing an operational transconductance amplifier (e.g., the OTA 310) having a first OTA input (e.g., the input 315a) and second OTA input (e.g., the input 315b), and coupling the first OTA input to an output of the first operation amplifier A1.

The method 500 also includes, at 525, providing a low-pass filter (e.g., the LPF 325) and coupling the LPF 325 to the switching node (e.g., through the pin PH). In this depicted example, the LPF 325 is configured to get the output voltage $V_{out}$ information. In some embodiments, a directly output voltage sensing mechanism may also be used to obtain the output voltage $V_{out}$ information. The method 500 also includes, at 530, providing a subtractor (e.g., the subtractor 335) and coupling the subtractor 335 to the switching node SW and an output of the LPF 325 (to generate a first differential signal 340).

The method 500 also includes, at 535, providing a current mirror (e.g., the current mirror 350) having a first terminal and a second terminal, providing a transistor (e.g., the transistor 345), and coupling the transistor 345 between the first terminal of the current mirror 350 and the subtractor 335. More specifically, the transistor 345 has a gate terminal, a source terminal and a drain terminal, the gate terminal is electrically connected to an output of the subtractor 335 to receive the comparison signal, and the drain terminal is connected to the first terminal of the current mirror 350. In some embodiments, the method 500 may also include providing a capacitor (e.g., the capacitor $C_{EM}$), coupling one plate of the capacitor $C_{EM}$ to the second terminal of the current mirror 350, and coupling the other plate of the capacitor C to power ground, for example.

The method 500 also includes, at 540, providing a variable resistor (e.g., the first variable resistor Rv1) and coupling the variable resistor between the power ground and the source terminal of the transistor 345. The method 500 also includes, at 545, applying an output of the OTA 310 on the first variable resistor Rv1 to adjust the resistance value of the first variable resistor Rv1.

The method 500 also includes, at 550 and 555, coupling the first OTA input (e.g., the input 315a) to the second terminal of the current mirror 350 through a switch (e.g., the switch S1), coupling the second OTA input (e.g., the input 315b) to the second terminal of the current mirror through a switch (e.g., the switch S2). The method 500 also includes, at 560, providing a level shifter (e.g., the level shifter 365) to receive a reference voltage (e.g., the reference voltage VREFIN). By providing the close loop control, the IMON generation circuit may advantageously perform auto-inductance detection (AID) and provide a more accurate IMON reconstruction method.

Although various embodiments have been described with reference to the figures, other embodiments are possible. For example, in some embodiments, instead of using variable resistors, variable current sources may be implemented in the IGC circuit to enable the IGC circuit be able to perform auto-inductance detection (AID) and provide a more accurate IMON reconstruction method. For example, in some embodiments, the state machine may be implemented using digital circuitry, alone or in combination with a processor executing a program of instructions. In some implementations, the state machine may, for example, be implemented using digital hardware circuits (e.g., FPGA, ASIC). Further, some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

In one exemplary aspect, an integrated circuit includes a first input terminal electrically connected to a first input node, a second input terminal electrically connected to a second input node, a third input terminal electrically connected to a third input node, an output terminal (IMON) electrically connected to an output node, a first operational amplifier electrically connected to the first input node and the second input node, an operational transconductance amplifier (OTA), having a first input and a second input, configured to generate a first control signal, the first OTA input is electrically connected to an output of the first operational amplifier, a voltage generation circuit electrically connected to the first input node and configured to obtain an output voltage of power converter, a current generation circuit coupled to the output of the voltage generation circuit and the first input node to generate a controlled current source to charge and discharge a capacitor, a second operational amplifier electrically connected to the current generation circuit, and, a level shifter electrically coupled to an output of the second operational amplifier, the output node, and the third input node. The current generation circuit also includes a first variable resistor, the first variable resistor is configured to adjust its resistance value in response to the first control signal.

In some embodiments, the voltage generation circuit may also include a direct output voltage sensing circuit. In some embodiments, the voltage generation circuit may also include a low-pass filter (LPF). In some embodiments, the current generation circuit may also include a subtractor electrically connected to the first input node and an output of the LPF to generate a comparison signal, a transistor having a gate terminal, a source terminal and a drain terminal, the gate terminal may be electrically connected to an output of the subtractor to receive the comparison signal. The current generation circuit further may also include a current mirror source having a first terminal and a second terminal. The first terminal of the current mirror source may be electrically coupled to the drain terminal, the second terminal of the current mirror source is electrically coupled to the capacitor. The first variable resistor may be coupled between a reference voltage node and the source terminal. In some embodiments, both the first OTA input and the second OTA input of the OTA may be selectively coupled to the second terminal of the current mirror source through a first switch and a second switch, respectively.

In some embodiments, the second operational amplifier may be electrically connected to the second terminal of the current mirror source. In some embodiments, the first switch may be configured to turn on and off in response to a first switch signal, the first switch signal may be a function of a pulse-width modulated (PWM) signal received by a power stage. In some embodiments, the second switch may be configured to turn on and off in response to a second switch signal, the second switch signal may be a function of the first switch signal and the pulse-width modulated signal.

In some embodiments, the IC may also include a compensation circuit, coupled between the second operational amplifier and the level shifter, configured to compensate for a temperature change and a gate voltage change. In some embodiments, the compensation circuit may also include an analog-to-digital converter (ADC) configured to receive a temperature value and a bias voltage, and configured to sample the gate voltage under the temperature value to generate a conversion signal, a state machine coupled to the ADC to receive the conversion signal and generate a second control signal and a third control signal in response to a lookup table, a second variable resistor coupled between the second operational amplifier and an intermediate node, wherein the intermediate node is electrically coupled to the level shifter, and, a third variable resistor coupled between the reference voltage node and the intermediate node. Each of the second and the third variable resistor may be configured to adjust its resistance value in response to the second control signal and the third control signal, respectively.

In some embodiments, the IC may also include a buffer coupled between the compensation circuit and the level shifter. In some embodiments, the second and the third variable resistor may be configured to have the same resistance. In some embodiments, the first operational amplifier may include an inverting operational amplifier with a compensating resistor. In some embodiments, the IC may also include a buffer coupled between the subtractor and the gate terminal. In some embodiments, the IC may also include a capacitor coupled between the second terminal of the current mirror source and the reference voltage node. In some embodiments, the IC may also include an integrated circuit (IC) package configured to house the first operational amplifier, the operational transconductance amplifier, the voltage generation circuit, the current generation circuit, the second operational amplifier, and the level shifter.

In another exemplary aspect, a system includes a main switch operative to selectively connect a first input terminal of an input voltage source to a switching node in response to a pulse-width-modulated (PWM) signal, a freewheeling rectifier coupled to conduct current between a second input terminal of the input voltage source and the switching node in response to the PWM signal, and, an integrated circuit configured to provide a current monitor output signal referenced to a reference voltage. The integrated circuit includes a first operational amplifier electrically connected to the switching node and the second input terminal of the input voltage source, an operational transconductance amplifier, having a first OTA input and a second OTA input, configured to generate a first control signal, wherein the first OTA input is electrically connected to an output of the first operational amplifier, a voltage generation circuit electrically connected to the first input node and configured to obtain an output voltage of power converter, a current generation circuit coupled to the output of the voltage generation circuit and the switching node to generate a controlled current source to charge and discharge a capacitor, a second operational amplifier electrically connected to the current generation circuit, and, a level shifter electrically coupled to an output of the second operational amplifier and configured to generate current monitor output signal referenced to the reference voltage. The current generation circuit includes a variable resistor, the first variable resistor is configured to adjust its resistance value in response to the first control signal, where both the first OTA input and the second OTA input of the operational transconductance amplifier are selectively coupled to the second terminal of the current mirror source through a first switch and a second switch, respectively.

In some embodiments, the current generation circuit may also include a subtractor electrically connected to the switching node and an output of the LPF to generate a comparison signal, a transistor having a gate terminal, a source terminal and a drain terminal, the gate terminal may be electrically connected to an output of the subtractor to receive the comparison signal. The current generation circuit may also include a current mirror source having a first terminal and a second terminal. The first terminal of the current mirror source may be electrically coupled to the drain terminal, the second terminal of the current mirror source may be electrically coupled to a capacitor, the first variable resistor may be coupled between the second terminal of the current mirror source and the source terminal.

In some embodiments, both the first OTA input and the second OTA input of the operational transconductance amplifier may be selectively coupled to the second terminal of the current mirror source through a first switch and a second switch, respectively. In some embodiments, the first switch may be configured to turn on and off in response to a first switch signal, the first switch signal may be a function of a pulse-width modulated (PWM) signal received by a power stage. In some embodiments, the second switch may be configured to turn on and off in response to a second switch signal, the second switch signal may be a function of the first switch signal and the pulse-width modulated (PWM) signal.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:
1. An integrated circuit (IC), comprising:
   a first input terminal electrically connected to a first input node;
   a second input terminal electrically connected to a second input node;
   a third input terminal electrically connected to a third input node;
   an output terminal electrically connected to an output node;
   a first operational amplifier electrically coupled to the first input node and the second input node;
   an operational transconductance amplifier (OTA), having a first OTA input and a second OTA input, configured to generate a first control signal, wherein the first OTA input is electrically connected to an output of the first operational amplifier;
   a voltage generation circuit electrically connected to the first input node and configured to obtain an output voltage of a power converter;
   a current generation circuit coupled to the output of the voltage generation circuit and the first input node to generate a controlled current source to charge and discharge a capacitor;
   a second operational amplifier electrically connected to the current generation circuit; and,
   a level shifter electrically coupled to an output of the second operational amplifier, the output node, and the third input node,
   wherein the current generation circuit comprises a first variable resistor, the first variable resistor is configured to adjust its resistance value in response to the first control signal.

2. The IC of claim 1, wherein both the first OTA input and the second OTA input of the operational transconductance amplifier are selectively coupled to the current generation circuit through a first switch and a second switch, respectively.

3. The IC of claim 2, wherein the voltage generation circuit comprises a low-pass filter (LPF).

4. The IC of claim 3, wherein the current generation circuit further comprises:
   a subtractor electrically connected to the first input node and an output of the LPF to generate a comparison signal;
   a transistor having a gate terminal, a source terminal and a drain terminal, the gate terminal is electrically connected to an output of the subtractor to receive the comparison signal; and,
   a current mirror source having a first terminal and a second terminal, wherein the first terminal of the current mirror source is electrically coupled to the drain terminal, the second terminal of the current mirror source is electrically coupled to the capacitor, wherein the first variable resistor is coupled between a reference voltage node and the source terminal.

5. The IC of claim 4, wherein the second operational amplifier is electrically connected to the second terminal of the current mirror source.

6. The IC of claim 4, wherein the capacitor is coupled between the second terminal of the current mirror source and the reference voltage node.

7. The IC of claim 4, further comprising: a buffer coupled between the subtractor and the gate terminal.

8. The IC of claim 2, wherein the first switch is configured to turn on and off in response to a first switch signal, wherein the first switch signal is a function of a pulse-width modulated (PWM) signal received by a power stage.

9. The IC of claim 8, wherein the second switch is configured to turn on and off in response to a second switch signal, wherein the second switch signal is a function of the first switch signal and the pulse-width modulated signal.

10. The IC of claim 1, further comprising: a compensation circuit, coupled between the second operational amplifier and the level shifter, configured to compensate for a temperature change and a gate voltage change.

11. The IC of claim 10, wherein the compensation circuit comprises:
   an analog-to-digital converter (ADC) configured to receive a temperature value and a bias voltage, and configured to sample the gate voltage under the temperature value to generate a conversion signal;
   a state machine coupled to the ADC to receive the conversion signal and generate a second control signal and a third control signal in response to a lookup table;
   a second variable resistor coupled between the second operational amplifier and an intermediate node, wherein the intermediate node is electrically coupled to the level shifter; and,
   a third variable resistor coupled between a reference voltage node and the intermediate node, wherein each of the second and the third variable resistor is configured to adjust its resistance value in response to the second control signal and the third control signal, respectively.

12. The IC of claim 10, further comprising: a buffer coupled between the compensation circuit and the level shifter.

13. The IC of claim 11, wherein the second and the third variable resistor are configured to have the same resistance.

14. The IC of claim 1, wherein the first operational amplifier comprises an inverting operational amplifier with a compensating resistor.

15. The IC of claim 1, further comprising: an integrated circuit package configured to house the first operational amplifier , the operational transconductance amplifier (OTA), the voltage generation circuit, the current generation circuit, the second operational amplifier, and the level shifter.

16. A power converter system, comprising:
a main switch operative to selectively connect a first input terminal of an input voltage source to a switching node in response to a pulse-width- modulated (PWM) signal;
a freewheeling rectifier coupled to conduct current between a second input terminal of the input voltage source and the switching node in response to the PWM signal; and,
an integrated circuit configured to provide a current monitor output signal (IMON) referenced to a reference voltage, the integrated circuit comprising:
a first operational amplifier electrically connected to the switching node and the second input terminal;
an operational transconductance amplifier (OTA), having a first OTA input and a second OTA input, configured to generate a first control signal, wherein the first OTA input is electrically connected to an output of the first operational amplifier;
a voltage generation circuit electrically connected to the switching node and configured to obtain an output voltage of the system,
a current generation circuit coupled to the output of the voltage generation circuit and the switching node to generate a controlled current source to charge and discharge a capacitor;
a second operational amplifier electrically connected to the current generation circuit; and,
a level shifter electrically coupled to an output of the second operational amplifier and configured to generate the IMON referenced to the reference voltage,
wherein the current generation circuit comprises a first variable resistor, the first variable resistor is configured to adjust its resistance value in response to the first control signal.

17. The power converter system of claim 16, wherein the current generation circuit further comprises:
a subtractor electrically connected to the switching node and an output of a low-pass-filter (LPF) to generate a comparison signal;
a transistor having a gate terminal, a source terminal and a drain terminal, wherein the gate terminal is electrically connected to an output of the subtractor to receive the comparison signal; and,
a current mirror source having a first terminal and a second terminal, wherein the first terminal is electrically coupled to the drain terminal, the second terminal of the current mirror source is electrically coupled to the capacitor,
wherein the first variable resistor is coupled between the second input terminal and the source terminal.

18. The power converter system of claim 17, wherein both the first OTA input and the second OTA input of the operational transconductance amplifier are selectively coupled to the second terminal of the current mirror source through a first switch and a second switch, respectively.

19. The power converter system of claim 18, wherein the first switch is configured to turn on and off in response to a first switch signal, the first switch signal is a function of the pulse-width modulated (PWM) signal.

20. The power converter system of claim 19, wherein the second switch is configured to turn on and off in response to a second switch signal, the second switch signal is a function of the first switch signal and the pulse-width modulated (PWM) signal.

* * * * *